United States Patent [19]

Meyer

[11] Patent Number: 4,521,989
[45] Date of Patent: Jun. 11, 1985

[54] SPROUTING APPARATUS

[76] Inventor: Bruno Meyer, Lindenstrasse 2, D-5238 Hachenburg, Fed. Rep. of Germany

[21] Appl. No.: 547,719

[22] Filed: Nov. 1, 1983

[30] Foreign Application Priority Data

Nov. 13, 1982 [DE] Fed. Rep. of Germany ....... 3242037

[51] Int. Cl.³ ............................................. A01G 31/02
[52] U.S. Cl. ........................................... 47/14; 47/65; 47/79
[58] Field of Search ............................... 47/14, 59–62, 47/65, 79, 1 A

[56] References Cited

U.S. PATENT DOCUMENTS

| 1,251,826 | 1/1918 | Schroeder | 47/14 |
| 2,244,677 | 6/1941 | Cornell | 47/65 X |
| 2,884,740 | 5/1959 | Hollander | 47/14 X |
| 3,254,447 | 6/1966 | Ruthner | 47/65 |
| 3,339,308 | 9/1967 | Clare | 47/79 |
| 4,379,375 | 4/1983 | Eisenberg et al. | 47/65 |

FOREIGN PATENT DOCUMENTS

| 45506 | 11/1966 | Fed. Rep. of Germany | 47/65 |
| 1089058 | 3/1955 | France | 47/14 |
| WO83/00274 | 2/1983 | PCT Int'l Appl. | 47/1 |

Primary Examiner—Robert A. Hafer
Assistant Examiner—Danton DeMille
Attorney, Agent, or Firm—Horst M. Kasper

[57] ABSTRACT

An apparatus is provided for the generation of sprouts from material capable of sprouting, in particular for seeds, grains, leguminous fruits, as well as for the hydroponic planting of grasses for human consumption with at least one container receiving the material for sprouting and at least one dish filled with liquid, into which the sprouting container can dip via a lift drive mechanism. The sprouting container is formed as a sieve and is constructed for easy exchangeability by being disposed in a recess or opening of a support plate. The support plate rests on a side frame. The lift drive mechanism is disposed at the side frame and is effective between the support plate and the dish to provide for dipping the sprouting container into the dish and for separating the sprouting container from the dish.

18 Claims, 3 Drawing Figures

SPROUTING APPARATUS

BACKGROUND OF THE INVENTION

1. Field of the Invention

The present invention relates to an apparatus and to a method for the production of sprouts from material suitable for sprouting, in particular from seeds, grains, leguminous seeds, as well as for the hydroponic planting of grasses for human consumption.

2. Brief Description of the Background of the Invention Including Prior Art

A sprouting or germination is known from German Pat. No. DE-PS 36,561, which comprises a water container with an insert for the reception of sand. The floor of this container is provided with only a few holes by way of which the sand, which is always disposed within its lowest layer in the water, is maintained continuously wet. The sand surface not disposed in the water receives the seeds. A glass plate is disposed above the seed, which is covered by a felt cover. This known sprouting apparatus may be suitable for testing the germinating capability of individual seed grains, but it is completely unsuitable for the generation of sprouts for human consumption. The reason for this is that only seed grains disposed directly on the sand surface are provided with a sufficient humidity as required for sprouting. Therefore, a higher layering of the seed grains is inappropriate. Since on the one hand the floor of the insert and thereby also the lower sand layer are continuously disposed in water and since on the other hand the upper region of the insertion is always closed, it is not possible for the fresh air required for the sprouting process to pass to the seed grains. This interferes with the sprouting process and can lead to spoiling and rotting of the seed grains. The sprouts here generated on the sand bed would have to be washed carefully before consumption in case they should be used for human consumption. This washing process damages the sprouts and still does not assure that no sand grains remain with the sprouts.

A sprouting or germination apparatus is disclosed in German Pat. No. DE-PS 63,327 which comprises a water container, which can be closed with a cover. A sprouting dish of porous clay is attached to the bottom side of the cover, which is lowered into the water and which can be lifted up again by rotation of the cover via slots at angles and pins. The water permeability of the sprouting dish is so low that it is by itself insufficient for the sprouting process. Therefore, the seeds to be sprouted are pretreated or, respectively, soaked in a special soaking or warming glass filled with water of from about 15 to 20 degree centigrade for a time of from 12 to 16 hours. Then the seed grains are carefully and in fact individually placed into recesses of the sprouting dish with tweezers, where then the sprouting process is started substantially by warming and not by humidity passing through the wall of the sprouting dish. If the speed has not picked up a sufficient amount of water during the pretreatment, then a sprouting is not possible or only possible to an insufficient degree. This sprouting apparatus is unsuitable for the production of sprouts for human consumption.

A sprouting or germination apparatus is taught and shown in the Belgian Pat. No. 566,856, which comprises a spacially fixed and heatable water container, and a bell provided with side openings is disposed above the same. The bell carries a shaft provided with several rope pulleys with ropes, which pulley can be turned by hand, and basket-like sprouting containers are hanged to the ropes. In the upper position of the sprouting containers, where they are resting on a flap covering the water container, the material for sprouting can be filled into and be removed from the sprouting containers via the openings of the bell, which is cumbersome and takes time based on the limited accessibility. A removal and thereby cleaning of the sprouting containers is not possible based on the rope attachment. The sprouting containers filled with material for sprouting are immersed into water by rotation of the shaft, where the material for sprouting stays for several hours depending on the water temperature and receives the amount of water necessary for the sprouting process. Then the sprouting containers are removed from the water, the water contained in the sprouting containers is removed in a special work step, and the sprouting containers are maintained for such time under closed flap, that is, in a space with increased temperature and humidity, until the sprouting process has started. This sprouting apparatus is expensive to construct and is unsuitable for the generation of sprouts for human consumption. The danger exists here that the material for sprouting, which has to pick up the water required for sprouting during the immersion step, suffocates in case of an untimely removal of the water. In addition, a sufficient air circulation is missing, interfering with the sprouting process.

An apparatus is known from German Patent Application Laid-Open No. DE-OS 3,038,443 for the production of sprouts of leguminous fruits, preferably soybeans, both for human consumption and as an animal feed. The apparatus comprises a climatic chamber which can be closed by way of doors. This climatic chamber receives at least one sprouting box filled with leguminous fruits, to which in each case a spraying provision is coordinated. By maintaining a certain temperature and by influencing the humidity of the air by spraying, after a relatively short time sprouts are generated from the leguminous fruits, which are ready for sale after a short time. This known apparatus requires high construction expenditures and a space volume which is not inconsiderable, such that it is unsuitable for use in a home in order to supply for example a person or a family with sprouts. In addition, this known apparatus carries the disadvantage that no sufficient air circulation is assured in the closed box, which interferes with the sprouting process. Further, the danger exists that water deposits at the bottom of the sprouting box and thus part of the leguminous fruits are disposed in water. The leguminous fruits can become unsuitable if they rest for extended times in water. Also, it cannot be excluded that the material for sprouting grows together and forms mats in such a sprouting box, which further interferes with the air circulation and the humidification.

SUMMARY OF THE INVENTION

1. Purposes of the Invention

It is an object of the present invention to provide an apparatus for the growth of sprouts from material suitable for sprouting, in particular from seeds, grains, leguminous fruits as well as for the hydroponic planting of grasses for human consumption.

A further object is that the apparatus can be produced without large expenditures and that it can be employed in households.

Another object of the present invention is to provide an apparatus for sprouting or germination which provides good air circulation as well as a uniform humidity in order to assure an optimum degree of effectiveness.

These and other objects and advantages of the present invention will become evident from the description which follows.

2. Brief Description of the Invention

The present invention provides an apparatus for the generation of sprouts from materials capable of sprouting which comprises a dish disposed closely spaced relative to a side frame for holding a feed liquid for the materials capable of sprouting, a support provision attached to the side frame for supporting the side frame and the dish, a lift drive disposed at the side frame and comprising a movable part to provide for changing the position of a support means relative to the dish, a sprouting container provided as a sieve, supported by the support means, and adapted to dip into the dish when the movable part of the lift drive is in a corresponding position.

The support means can be provided as a support plate having an open area for placing the sprouting container. The dish can be in a spacially fixed location and the support means can be liftable upward and downward. The support means can be disposed in a spacially fixed position and the dish can be joined to the movable part of the lift drive for providing the possibility of changing its vertical level. The support means is supported by a support arm of the lift drive. The support means and the support arm can form a single piece.

The lift drive can comprise a spindle disposed vertically, a drive motor connected to the spindle, and a lift nut providing the movable part. A second side frame can be disposed at a distance from the first side frame and the support means and the dish can be disposed between the two side frames. A second spindle can be disposed at the second side frame, and a chain connection can connect the two spindles to the drive motor.

A second apparatus of the same type can be disposed on top of the first apparatus and the spindles of the two can be connected to each other by coupling means. The dish preferably is provided as a removable part at the support provision. A plurality of sprouting containers can be provided and a plurality of dishes and a separate dish can be provided for each sprouting container.

A control device for the motor can provide a time control of the position of the movable part. The control device can comprise an electronic circuit and an electronic timing device and the lift drive can include electrical position switches, which are adjustable in their setting to provide for a close and a distant relative position of the support means and of the dish. The lower half of the sprouting container is perforated such that at least about 10 percent and preferably at least about 30 percent of the surface of the lower half of the sprouting container is open.

There is also provided a method for the production of sprouts from a material capable of sprouting which comprises filling a dish with a feed solution for sprouting, disposing a sprouting container provided as a sieve on a support means located above the dish, filling the sprouting container with material suitable for sprouting, and changing the relative position of the dish and of the sprouting container at appropriate intervals such that the sprouting container dips into the feed solution in the dish at certain times and such that the sprouting container is removed from the dish at other times. The changing of the dish and of the sprouting container can be provided by lowering the sprouting container into the dish.

Preferably, the upper and the lower position of the sprouting container are adjustably limited based on limit switches controlling the lift drive operation. The dish can be moved up and down at appropriate times to provide contact between the feed solution and the sprouting container.

The sprouting containers provided as a sieve assure an optimum air circulation and prevent water from remaining on the bottom of the sprouting container after dipping and withdrawing of the sprouting container into the water filled dish. Furthermore indirect lighting can pass via the openings in the sieve to the material for sprouting in order to improve the sprouting process. The support and holding of the sprouting container with a special support plate cooperating with a lift drive allows a withdrawal of the sprouting container, which not only makes the filling and emptying process easier, but which allows in addition a good cleaning of the sprouting container. The accessibility of the sprouting container and the control of the material for sprouting is rendered easier in case only one side support frame is employed, which is advantageous in homes.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
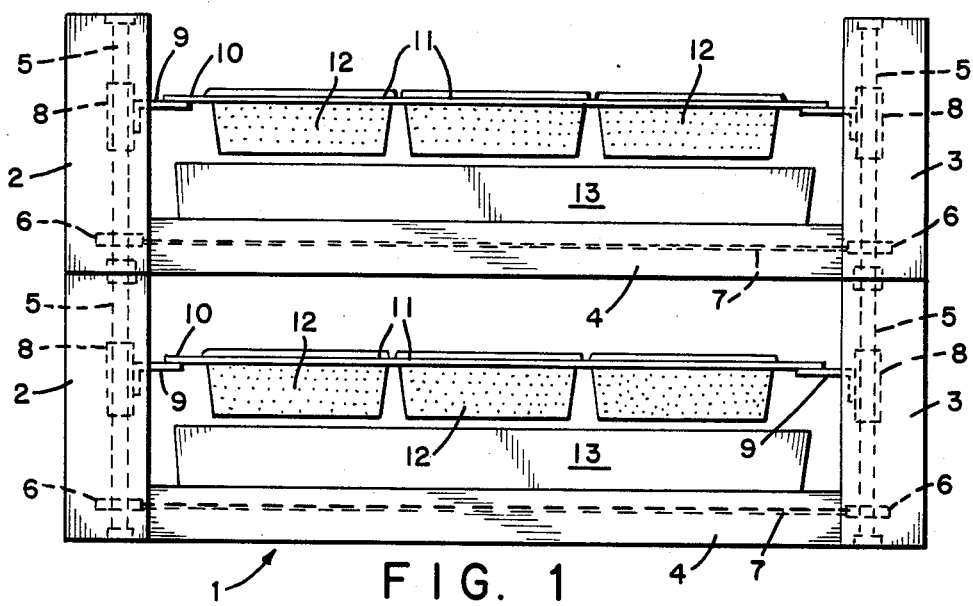
FIG. 1 is a schematic elevational side view of the apparatus according to the invention.

In accordance with the present invention there is provided an apparatus for the production of sprouts from material for sprouting, in particular from seeds, grain, legumes, as well as for hydroponic planting of grasses for human consumption, which comprises at least one sprouting container receiving the material for sprouting and a dish to be filled with water, into which the sprouting containers can be dipped via a lift drive. The sprouting container 12, 32 is provided as a sieve and is hanging in the opening 11, 31 of a support plate 10, 29, such that the support plate 10, 29 and the dish 13, 33 are joined to at least one side support frame 2, 3, 22. The lift drive 5-8, 25-28 is disposed in the support frame 2, 3, 22 and becomes effective between the support plate 10, 29 and the dish 13, 33.

The dish 13, 33 can be disposed at a fixed location in space and the support plate 10, 29 can be provided as movable upward and downward. Alternatively, the support plate 10, 29 can be provided as fixed in space and the dish 13, 23 can be furnished as being movable upward and downward. The support plate 10 can be supported as least on one support arm 9 of the lift drive 5-8. Preferably, the support plate 10 and the support arm 9 are provided as a single piece 29.

The lift drive 5-8, 25-28 can be formed from at least one spindle 5, 25 with a lift nut 8, 28 and a drive motor. The support plate 10 and the dish 13 can be provided between two support frames 2, 3 disposed at a distance from each other. The spindles 5 of one or of two support frames 2, 3 can be connected to a joint drive motor via a chain 7. At least two support frames 2, 3, or respectively 22 can be disposed on top of each other and their spindles 5 or, respectively, 25 can be connected to each other via coupling pieces. The dish 13, 23 can be disposed exchangeably at the support plate 10, 29. A separate dish 13, 33 can be associated with each sprouting container 12, 32. A control device adjustable for defined time periods can be coordinated to the lift drive 5-8, 25-28.

FIG. 1 shows an apparatus 1 for the production of sprouts from material for sprouting intended for human consumption, which comprises two support frames 2, 3 disposed at a distance from each othr, which are solidly connected to each other with a floor plate 4 having a U-shaped cross-section open to the bottom or with a corresponding box profile.

A vertical spindle 5 is rotatably disposed at each support frame 3. Each spindle supports at its bottom end a chain wheel 6, which is solidly connected to it. The two chain wheels 6 are surrounded by a chain 7 only indicated and are maintained thereby in a drive motion of the same direction. A drive chain wheel not illustrated in the drawing engages the chain for this purpose, which is attached to the shaft of an electric drive motor or, respectively, of a gear motor. The electric motor can be disposed either at a support frame 2, 3 or below the floor plate 4.

A lift nut 8 is disposed on each spindle 5, which is secured in a conventional way via a guide or the like against a rotary motion. A support arm 9 is solidly connected at the lift nut 8 according to this embodiment, which arm 9 protrudes from the support frame 2, 3 and which in connection with a guide at the support frame 2, 3 prevents the abovementioned rotation of the corresponding lift nut 8. The two support arms 9 receive a support plate 10, which is either solidly, for example by way of screws or bolts, connected to the support arm 9 or for example is disposed loosely, but securely and thus immovably on the support arms 9 upon a corresponding construction of the support amrs 9 and/or of the support plate 10. The support arms 9 can also form a single piece in conjunction with the support plate 10. The support plate 10 is provided with several, for example three, recognizable openings or recesses 11 shown in the drawing sequentially next to each other, and further an additional three openings can be disposed further behind. A sprouting container 12 is loosely and thus exchangeably placed into each of the openings and the walls and the floor of the containers are provided as sieves. The sieve openings in this case have to be so small that the material for sprouting filled into the sprouting container 12 only as a thin layer cannot fall out of or through the container. Depending on the material to be subjected to sprouting, the containers can also have different size sieve openings depending on the material employed. Each sprouting container can be subdivided into two or more cases and/or provided of such height, that it can receive an additional sieve insert without interfering with the sprouting process.

A dish 13 with liquid, in general ordinary water, is provided below the sprouting container 12. The dish 13 is supported loosely and thus exchangeably at the support plate 4 and its surface is provided of such size that it can receive all of the sprouting containers 12. It is also possible as a variation from the embodiment shown, to coordinate to each sprouting container a separate dish 13 such that the dishes 13 can be exchanged depending on the sprouting time of the material for sprouting in the individual sprouting containers and such that the water can be renewed. In this case an exchange of the individual sprouting containers 12 and/or of the dishes 13 is possible without interfering with the functioning of the apparatus 1.

In order to supply the material for sprouting disposed in the sprouting containers with the water required for the sprouting process, the electric motor not shown in detail in the drawing is turned on and thereby the spindles 5 are rotated in the direction, which provides for a lifting up of all lift nuts 8. At the same time the support arms 9 move downward with the support plate 10 and the sprouting containers 12 dip into the water of the dish 13. The immersion depth is designed such that all the material for sprouting disposed in the sprouting container 12 is surrounded completely by the water flowing in through the sieve holes. After a predetermined time depending on the nature of the material for sprouting the electric drive motor is switched to an opposite sense of rotation by a conventional time control device such that the sprouting containers 12 lift upward out of the dish 13. The water entered into the sprouting container 12 can run off completely through the sieve openings and air and possibly also light can pass to the material for sprouting.

Accordingly, at a later time, again depending on the nature of the material for sprouting, the previous dipping process is repeated, where the switching on of the electric motor is generally performed via the control device, while the switching off is effected either by end switches or by the control device. The control apparatus thus assures the periodic dipping such that a continuous uniform provision of moisture is guaranteed to the material for sprouting.

Advantageously, the size of the individual sprouting containers 12 is such that they or one of their subdivided cases can accept a one-meal portion of material for sprouting for one person or for one family. This means that a support plate 10 with six sprouting containers 12 can accept for example food for two days. In case of a larger need of sprouts or, respectively, in case of longer germination times a second similar apparatus 1 can be employed. It is possible in this context to place the support frame 2, 3 of the second apparatus 1 on top of the support frame 2, 3 of the first apparatus 1 and to connect the spindles 5 of the lower apparatus 1 via special coupling pieces to the spindles 5 of the upper apparatus 1, which allows saving one drive motor with the corresponding chain 7 and the sprocket wheels 6. However, a separate lifting up or lowering down of the support plates is not possible in this case.

Figure 2:
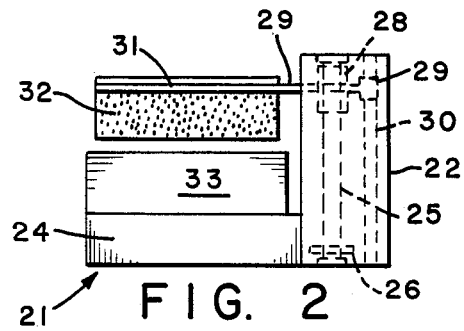
FIG. 2 is another elevational side view of an apparatus according to the invention.

The apparatus 21 shown in FIG. 2 is provided with only one support frame 22, to which is coordinated a floor plate 24, in contrast to the embodiment of FIG. 1. A gear wheel 26 is carried by a vertical spindle 25 rotatably supported at the support frame 22. The gear wheel engages with a pinion of a drive motor disposed in the support frame 22 and not illustrated here or with a gearing provision. The spindle 25 receives a lift nut 28, which is secured against rotation via an arm 29 at a rail 30 attached to the support frame 22 and which is guided to provide lifting up and lowering down motions. This arm 29 protrudes simultaneously also through at least one vertical slot out of the vertical support frame 22 and forms here simultaneously a fork-shaped receptacle 31, which receives the sprouting container 32 produced of sieve metal sheet and having a side edge, which container is hung in from above or which is slid in from the side. One or several water dishes 33 adapted to the size and number of the sprouting containers 32, are supported on the bottom plate 24. The mode of operation of this apparatus 21 corresponds to the mode of operation of the apparatus 1.

Figure 3:
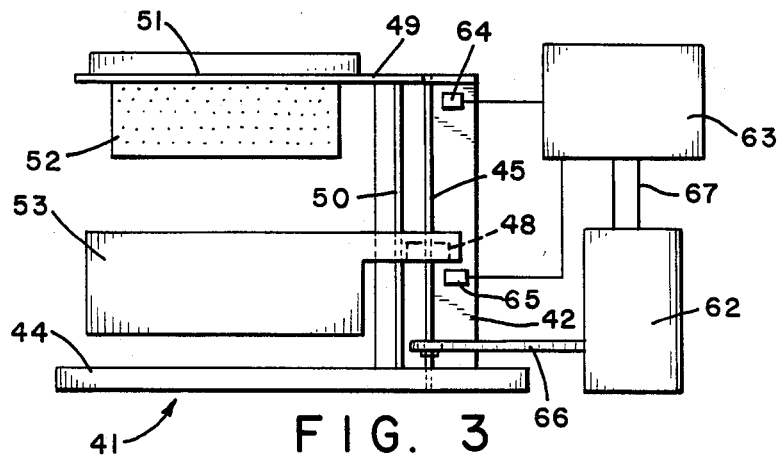
FIG. 3 shows an embodiment of the invention where the sprouting containers are controlled such as to take two positions.

Alternatively and in modification of the embodiments illustrated in the drawing, it is possible to dispose the support plate 10 or, respectively, the arm 29 with the sprouting containers 12, 32 as spacially fixed and to provide a lift drive at the dish 13 or, respectively, 33. Such an embodiment is illustrated in FIG. 3. The apparatus 41 again is provided with only one support frame 42, to which is coordinated a floor plate 44, again in contrast to the embodiment of FIG. 1. The floor plate is preferably disposed substantially below the sprouting container in order to provide the apparatus with maximum stability against tilting over. A transmission 66 drives a vertical spindle 45, which can rotate based on support provisions at the support frame 22. The transmission can be a gear transmission, a chain transmission or a belt or pulley transmission. The transmission is connected to the electric motor 62 for providing rotation power. The spindle 45 maintains a lift nut 48. Rotation occurs via a rail 50 attached to the support frame 42, to the base plate 44 and to the support means 49, which rail passes through a recess in the support arm of the dish 53. The support arm is constructed to fit and engage the lift nut 48. The arm 49 is attached to the vertical support frame 42 and forms a fork-shaped opening 51, which allows positioning of the sprouting container 52 produced from sieve metal sheet. The container is hung in from above. One or several water dishes 53 are supported on the spindle 45 and they are adapted to the size and number of the sprouting containers 52.

Limit switches 64 and 65 are switched on if the end part of the dish near the lift nut contacts the same. The contact provides in each case a signal which is transmitted via conducting wires to a controller 63 which can contain a timing device. The controller 63 is connected via wires 67 to the electric motor 62 and provides power to the motor in case a change in relative position of the sprouting container and of the dish is to be performed.

Finally, it is also possible in case of a hydroponic planting of grasses to cover the floor of the sprouting container with a thin layer of absorbent cotton, paper or the like, onto which the seeds are then placed.

It will be understood that each of the elements described above, or two or more together, may also find a useful application in other types of sprouting system configurations and plant growth procedures differing from the types described above.

While the invention has been illustrated and described as embodied in the context of a sprouting apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for the generation of sprouts from materials capable of sprouting comprising
   a side frame;
   a dish disposed closely spaced relative to the side frame for holding a feed liquid for the materials capable of sprouting;
   a support provision attached to the side frame for supporting the side frame and the dish;
   a support means;
   a spindle disposed vertically;
   a drive motor connected to the spindle;
   a lift nut attached to the support means and secured to the spindle and secured against rotation, whereby the motor rotates the spindle and provides vertical displacement of the lift nut;
   a support plate having an open area and supported by the support means;
   a sprouting container provided as a sieve, placed into the open area of the support plate, and adapted to dip into the dish when the movable part of the lift drive is in a corresponding position.

2. The apparatus for the generation of sprouts according to claim 1 wherein the dish is in a spacially fixed location and where the support means is liftable upward and downward.

3. The apparatus for the generation of sprouts according to claim 1 wherein the support means is supported by a support arm of the lift drive.

4. The apparatus for the generation of sprouts according to claim 3 wherein the support means and the support arm form a single piece.

5. The apparatus for the generation of sprouts according to claim 1 further comprising
   a second side frame disposed at a distance from the first side frame and wherein the support means and the dish are disposed between the two side frames.

6. The apparatus for the generation of sprouts according to claim 5 further comprising
   a second spindle disposed at the second side frame;
   a chain connection connecting the two spindles to the drive motor.

7. The apparatus for the generation of sprouts according to claim 5 further comprising a second apparatus for the generation of sprouts disposed on top of the first apparatus and where the spindles of the two are connected to each other by coupling means.

8. The apparatus for the generation of sprouts according to claim 1 wherein the dish is provided as a removable part at the support provision.

9. The apparatus for the generation of sprouts according to claim 1 wherein a plurality of sprouting containers is provided and a plurality of dishes and where a separate dish is provided for each sprouting container.

10. The apparatus for the generation of sprouts according to claim 1 further comprising
    a control device for the motor for providing a time control of the position of the movable part.

11. The apparatus for the generation of sprouts according to claim 10 wherein the control device comprises an electronic circuit and an electronic timing device and wherein the lift drive includes electrical position switches, which are adjustable in their setting to provide for a close and a distant relative position of the support means and of the dish.

12. The apparatus for generation of sprouts according to claim 1 wherein the lower half of the sprouting container is perforated such that at least about 10 percent of the surface of the lower half of the sprouting container is open.

13. The apparatus for generation of sprouts according to claim 12 wherein at least about 30 percent of the surface of the lower half of the sprouting container is open.

14. An apparatus for the generation of sprouts from materials capable of sprouting comprising
a side frame;
a support provision attached to the side frame for supporting the side frame;
a sprouting container provided as a sieve, attached to the frame;
a spindle disposed vertically at the side frame;
a drive motor connected to the spindle;
a lift nut secured against rotation and engaging the spindle;
a support attached to the lift nut;
a dish disposed on the support for holding a feed liquid for the materials capable of sprouting whereby the motor rotates the spindle and provides vertical displacement of the lift nut for changing the vertical level of the dish for allowing the sprouting container to dip into the dish when the movable part of the lift drive is in a corresponding position.

15. A method for home production of sprouts from a material capable of sprouting comprising
filling a dish with a feed solution for sprouting;
disposing a sprouting container provided as a sieve on a a support plate having an open area and supported by a support means located above the dish;
filling the sprouting container with material suitable for sprouting; and
switching on a drive motor connected to a vertically disposed spindle;
rotating the vertically disposed spindle by transfer of the rotation force of the motor;
moving vertically a lift nut engaging the threads of the spindle based on the rotation of the spindle while maintaining the angular position of the lift nut versus the spindle axis substantially fixed;
changing the vertical level of a dish attached to the lift nut based on the motion of the lift nut;
dipping the sprouting container into the feed solution in the dish at certain times and and removing the sprouting container from the dish at other times for providing suitable sprouting conditions.

16. The method for the production of sprouts from a material capable of sprouting according to claim 15 wherein the changing of the dish and of the sprouting container is provided by lowering the sprouting container into the dish.

17. The method for the production of sprouts from a material capable of sprouting according to claim 16 further comprising adjustably limiting the upper and the lower position of the sprouting container based on limit switches controlling the lift drive operation.

18. The method for the production of sprouts from a material capable of sprouting according to claim 15 wherein the dish is moved up and down at appropriate times to provide contact between the feed solution and the sprouting container.

* * * * *